H. A. BOYDE.
BRAKING MEANS.
APPLICATION FILED JAN. 11, 1919.
1,320,981.
Patented Nov. 4, 1919.
2 SHEETS—SHEET 1.
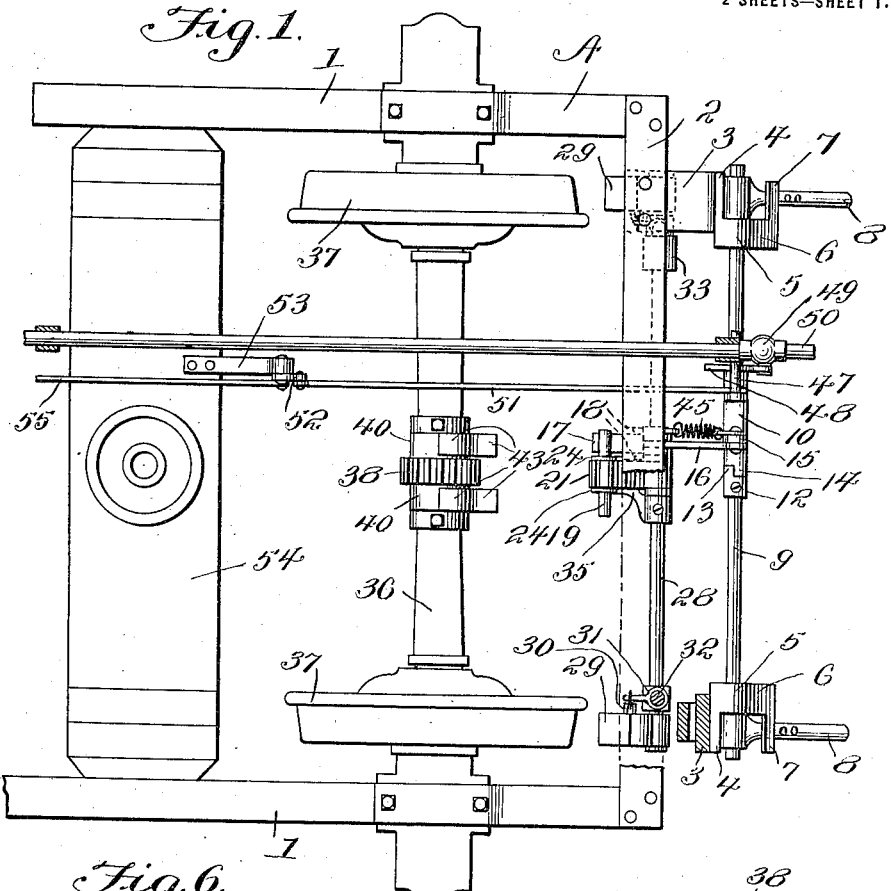
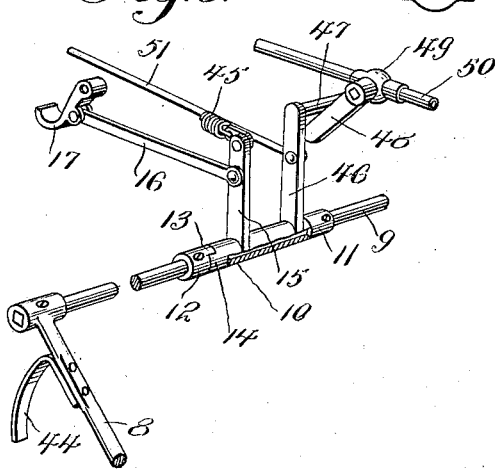
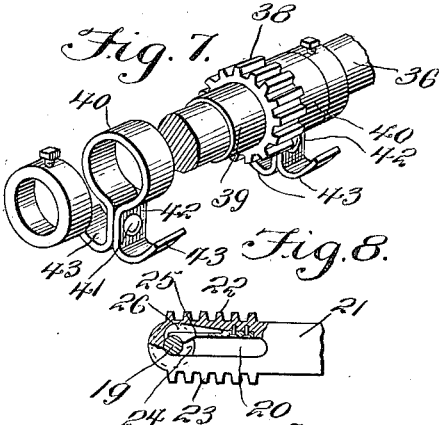
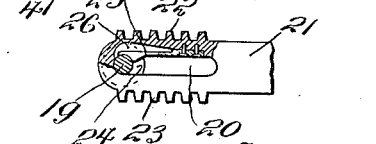
Inventor
Harry A. Boyde

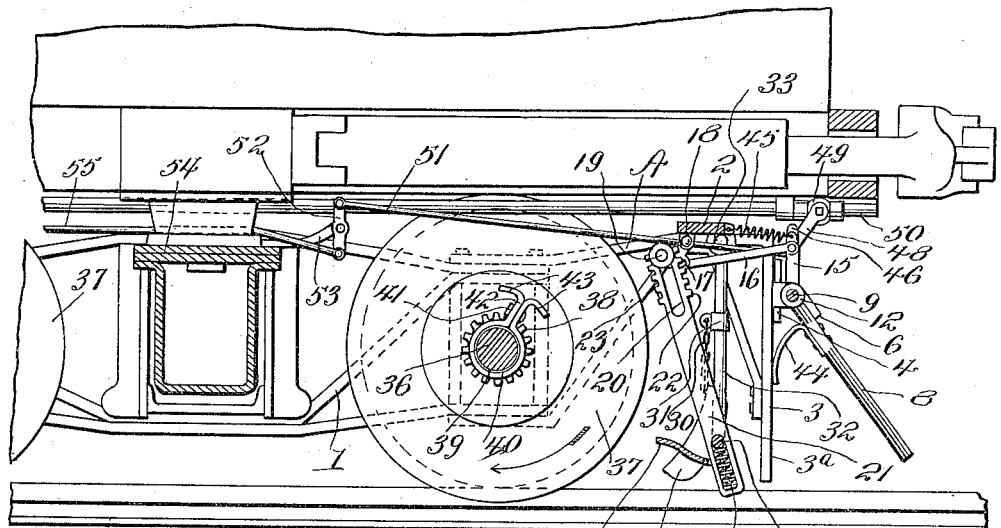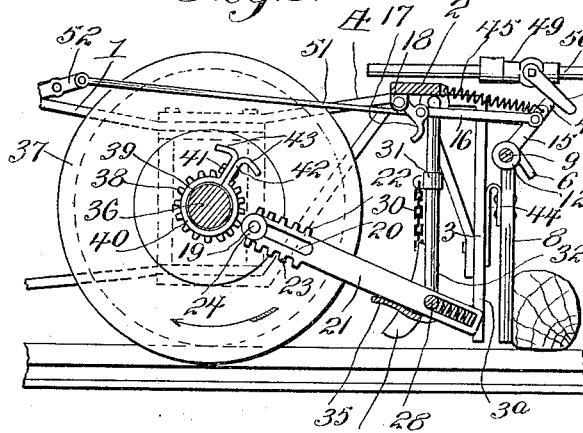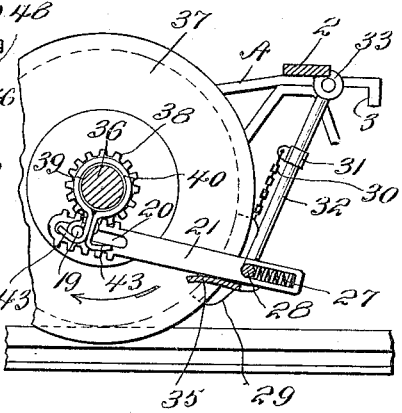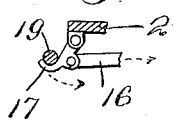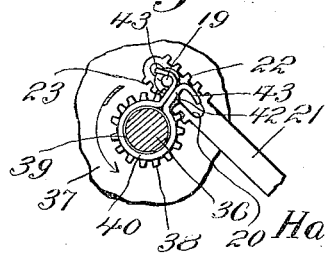

UNITED STATES PATENT OFFICE.

HARRY A. BOYDE, OF SAVANNAH, GEORGIA.

BRAKING MEANS.

1,320,981.  Specification of Letters Patent.  Patented Nov. 4, 1919.

Application filed January 11, 1919. Serial No. 270,718.

*To all whom it may concern:*

Be it known that I, HARRY A. BOYDE, a citizen of the United States, residing at Savannah, in the county of Chatham and State of Georgia, have invented certain new and useful Improvements in Braking Means; and I do hereby declare the following to be a full, clear, and exact description of the invention, such as will enable others skilled in the art to which it appertains to make and use the same.

This invention relates to braking means, and more particularly to a braking mechanism specially adapted for use in connection with railway and street cars.

One of the main objects of the invention is to provide a mechanism of the character stated of simple construction and operation which may be readily applied to a car truck of standard construction.

A further object is to provide means for applying the brakes, this means being actuated by a guard member positioned in front of the car wheels so as to be tripped upon impact with an object.

Another object is to provide means associated with the braking mechanism for operating the release valve in the air line of the pneumatic braking system of a railway car simultaneously with tripping of the braking means, the brakes being applied by the usual mechanism as well as by the improved brake applying means, so as to insure operation thereof.

Further objects will appear from the detailed description.

In the drawings:

Figure 1 is a top plan view of a car truck of conventional construction with a braking mechanism constructed in accordance with my invention applied.

Fig. 2 is a longitudinal section taken through the truck and associated parts.

Fig. 3 is a fragmentary detail, partly in section, showing the operation of the tripping means.

Fig. 4 is a detail of the same showing the brakes applied.

Fig. 5 is a detail of the means for holding the rack bar in engagement with the actuating gear, above the axle.

Fig. 6 is a detail of the connection for tripping the rack bars at both ends of the truck.

Fig. 7 is a detail of the hooks and gear for actuating the rack bar, and associated parts.

Fig. 8 is a detail of the means for normally holding the pin in the outer end of the slot of the rack bar.

Fig. 9 is a detail of the hook for normally holding the rack bar raised.

The truck designated generally by A, which may be of any suitable standard construction, comprises the side frames 1 and the transverse end brace bars 2. Two substantially L-shaped or rectangular guard brackets 3 are secured to the under face of brace bar or beam 2 adjacent each end thereof. A plate 4 is secured to the vertical arm 3ª of each of the brackets 3 and is provided with an integral bearing sleeve 5 having a forwardly projecting arm 6 which carries an outwardly extending rectangularly disposed finger 7 forming a stop for positively limiting upward movement of a trip arm 8 which is secured on the end of a transverse rod 9 rockably supported in the bearing sleeves 5. An elongated sleeve 10 is loosely mounted upon rod 9 between limiting collars 11 and 12 which are secured to the rod, the collar 12 being provided with an inwardly extending element 13 which is normally in abutment with a similar element 14 carried by one end of the sleeve 10. By this arrangement, the sleeve may be rocked downwardly and outwardly about rod 9, and when rod 9 is rocked downwardly and outwardly similar movement will be imparted to the sleeve through collar 12.

Sleeve 10 is provided with an upwardly extending arm 15 formed integral therewith which is pivotally connected intermediate its ends to the outer end of a link 16, the inner end of which is pivoted to a hook 17 pivoted for rocking movement about a horizontal axis between depending ears 18 positioned on the under face of brace beam 2. This hook has its bill directed upwardly and is adapted to normally receive one end portion of a pin 19 which is normally positioned in the outer end of a longitudinally extending slot 20 formed through a rack bar 21 the head of which is provided on its upper and lower faces with integral racks 22 and 23, respectively. This pin is provided a short distance from each end with a disk 24 secured thereon, these disks serving to prevent movement of the pin transversely of the rack bar, and the pin is held normally in the outer end of the slot by a shouldered leaf spring 25 in engagement therewith, this spring being mounted in a suitable recess 26 provided in the upper arm of the rack bar head. The rack is provided, in its outer or lower end, with a longitudinally extending slot which receives an expansion coil spring 27 mounted therein and confined between the lower end of the rack bar and a brake bar 28 which extends through this slot and is provided adjacent each end with a brake shoe 29 rockably mounted thereon and having its downward movement positively limited by a suitable length of chain 30 secured to the upper end of the brake shoe and to a collar 31 secured on a hanger rod 32 the upper end of which is bent at right angles and is rockably mounted in a bearing sleeve 33 carried by beam 2. The downward movement of rack bar 21 about the brake 28, when released from hook 17 by means to be described, is limited by a slightly arched resilient stop arm 35 which projects inwardly from brake bar 28, the outer end of this arm being enlarged and bifurcated to straddle the lower end of the brake bar and to guide the same during vertical movement thereof. The truck A rotatably supports an axle 36 in the usual manner, which is provided at each end with a wheel 37 of standard construction, the tread portion of this wheel being in alinement with the brake shoe 29 so as to be engaged thereby when the brakes are applied. A spur gear 38 is secured upon this axle at the center thereof, this gear being provided at each side with an elongated neck 39. This neck receives a steel band 40 frictionally secured thereon by means of a securing screw 41 and a nut associated therewith, this screw being inserted through alined openings through parallel arms 42 formed integral with and projecting substantially radially from the band 40. The free end portions of these arms are turned outwardly in opposite directions to provide oppositely directed hooks 43. The gear 38 is positioned in alinement with rack bar 21, and the bands 40 are so positioned that the hooks 43 thereof will engage the end portions of pin 19 when the rack bar is lowered and supported by the resilient stop arm 35. The trip arms 8 are normally held in raised position by leaf springs 44 secured thereto and bearing upon the outer faces of the vertical arms 3ª of the brackets 3. Upon impact of either of the trip arms 8 with an object, the shaft 9 will be rocked downwardly and outwardly so as to move the hook 17 into inoperative position, this hook being normally held in operative position by a tension spring 45 having one end secured to the arm 15 and secured at its inner end to the cross beam 2. When the hook 17 is thus rocked out of engagement with pin 19, the rack bar 21 is released and will drop into lowered position, being supported in this position by arm 35 as in Fig. 3. When the rack bar is lowered, the pin 19 thereof is in the path of travel of the hooks 43 of the bands 40. If the car is traveling in the direction indicated in Figs. 3 and 4, these hooks will engage the pin and serve to raise the rack bar into engagement with the gear 38, the bar being positioned beneath the axle. The gear meshes, in this case, with the upper rack 22 of the bar so as to draw the bar rearwardly thus forcing the brake shoes 29 into engagement with the wheels 37 so as to automatically apply the brakes, the pressure exerted upon the brakes increasing in direct proportion to the forward travel of the car thus insuring that the car will be quickly brought to a stop. In this connection, it is to be noted that the bands 40 are secured frictionally upon the sleeves 39 of the gear 38 so as to normally rotate with the gear and the axle, these bands slipping upon the sleeves 39 of the gear when in engagement with the pin 19, the hooks 43 serving to hold the rack bar raised and rack 22 in mesh with the gear, as illustrated in Fig. 4.

In addition to the means above described for applying the brakes, I also provide means whereby a valve in the usual air line of the braking system of a railway car can be opened simultaneously with the tripping of the brakes, the brakes being also applied by the usual pneumatic braking apparatus. For this purpose, sleeve 10 which is mounted upon the rod 9, is also provided with an arm 46 carrying at its upper end a rectangularly disposed finger 47 positioned for engagement with an arm 48 projecting from the stem of a valve 49 interposed in the air line 50. When the rod 9 is rocked in the manner described to release the rack bar 21, finger 47 is brought into engagement with arm 48 so as to open the valve 49 thus putting the pneumatic braking appliance into operation. As the pneumatic braking apparatus is of standard and well known construction, and as any preferred form may be employed, it is not thought necessary to illustrate or describe the same here, the desired object being to provide means for opening the valve in the pipe line simultaneously with tripping of the brake. Arm 46 is connected by a connecting rod 51 to the upper end of a short lever 52 which is pivoted intermediate its ends upon a bracket 53 secured upon the center bolster 54 of the truck, the lower end of this lever being connected to a rod 55 the outer end of which is adapted to be connected to an arm corresponding to arm 46 of a similar brake applying means. By this arrangement, when the brakes at one end of the truck are tripped, the brakes at the other end will also be simultaneously tripped, thus insuring applying of both pairs of brakes so as to insure quick stopping of the car. In this case, the wheels 37 will be rotated oppositely to the direction of rotation indicated in Figs. 2, 3 and 4, so that the rack bar 21 will be raised by the hooks 43 so as to bring the rack 23 into engagement with gear 38 above the axle, as illustrated in Fig. 5. The operation of the braking mechanism, in this case, will be similar to the operation previously described with the exception that rod 9 will not be rocked, but sleeve 10 will be rocked downwardly and outwardly upon this rod through the medium of connecting rod 51 and arm 46.

As will be readily understood, the brackets 3 are adapted to support between them, adjacent the lower ends thereof, the usual fender or guard rod, a similar rod being carried by the trip arms 8 adjacent the lower ends of the same. This provides a fender structure which serves to effectually prevent a person or an object struck from passing beneath the car, the car being quickly stopped by application of the brakes in the manner previously described so as to prevent injury or bruising of a person struck by being dragged along the track by the fender. In this manner the tripping arms 8 and the parts associated therewith serve to effectually prevent a person struck from passing beneath the car while also bringing the car to a quick stop so as to prevent serious injury to a person after being struck.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In braking means, a truck, an axle rotatably supported thereby, wheels secured on said axle, rockable hangers, a brake bar connecting said hangers, brake shoes secured on the ends of said bar and positioned to be moved into engagement with said wheels, a rack bar loosely connected at one end to said brake bar, a gear secured to said axle in position to be engaged by the rack bar when said bar is in lowered position, means for normally holding said rack bar in raised position, and trip arms positioned in front of said wheels and connected to the means for holding the rack bar raised so as to move said means into inoperative position to permit lowering of the bar into operative position when the tripping arm strikes an obstacle.

2. In braking means, the combination with a truck, of an axle rotatably supported thereby, wheels secured on said axle, rockable hangers, a brake bar connecting said hangers, brake shoes secured on the ends of said bar for engagement with the wheels, a gear secured on said axle, a rack bar loosely mounted at its lower end on said bar to engage said gear when in lowered position, a tripping rod rockably mounted in advance of said brake bar and provided at each end with a downwardly and outwardly inclined tripping arm, connections between said tripping rod and the rack bar for holding said bar in raised position adapted to release the rack bar so as to permit downward movement thereof when the tripping rod is rocked downwardly and outwardly, and coöperating means carried by the axle and the rack bar for moving the rack bar into operative engagement with said gear and for holding it in such position.

3. In braking means, the combination with a truck, of an axle rotatably supported thereby, a gear secured on said axle, wheels secured on the axle adjacent each end thereof, rockably mounted hangers, a brake bar connecting said hangers, brake shoes mounted on said bar for engagement with the wheels, a rack bar connected at its lower end to said brake bar and positioned in alinement with said gear, a tripping rod provided at each end with a downwardly and forwardly directed tripping arm, connections between said rod and the rack bar for normally holding said bar in raised position, said connections being adapted to release the rack bar so as to permit downward movement thereof upon downward and rearward movement of the tripping arm, an air line, a release valve interposed therein, connections between the tripping rod and said valve for operating the valve upon downward and rearward rocking movement of said rod, and coöperating means carried by the axle and the rack bar for moving said bar into operative engagement with the gear when the rack bar has been lowered and the axle is rotated.

4. In braking means, the combination with a truck, of an axle rotatably supported thereby, wheels secured on said axle, rockable hangers, a brake bar connecting said hangers, brake shoes mounted on said bar for movement into and out of engagement with the wheels, a rack bar loosely connected at one end to said brake bar, tripping means for normally holding the rack bar in raised position, means for limiting downward movement of the rack bar, said rack bar being provided adjacent its other end with a longitudinally extending slot, a pin extending through said slot and normally releasably held in the outer end thereof, said pin projecting beyond the sides of the rack bar, a gear secured on the axle in alinement with the rack bar, and members frictionally secured upon the axle so as to normally rotate therewith, said members being provided with oppositely directed hook elements positioned to engage the end portions of said pins when the rack bar is lowered and to move the rack bar into operative engagement with said gear and maintain it in this position.

In testimony whereof I affix my signature in presence of two witnesses.

HARRY A. BOYDE.

Witnesses:
 E. J. BOYDE,
 E. S. FULLER.

Copies of this patent may be obtained for five cents each, by addressing the "Commissioner of Patents, Washington, D. C."